United States Patent
Ionescu

(10) Patent No.: US 7,764,747 B2
(45) Date of Patent: Jul. 27, 2010

(54) METHODS AND SYSTEMS FOR TRANSMITTING AND PROCESSING PILOT SIGNALS

(75) Inventor: Dumitru Mihai Ionescu, San Diego, CA (US)

(73) Assignee: Olympus Corporation, Hachioji-Shi, Tokyo (JP)

(*) Notice: Subject to any disclaimer, the term of this patent is extended or adjusted under 35 U.S.C. 154(b) by 682 days.

(21) Appl. No.: 11/694,898

(22) Filed: Mar. 30, 2007

(65) Prior Publication Data

US 2008/0240264 A1      Oct. 2, 2008

(51) Int. Cl.
*H04L 27/06* (2006.01)
(52) U.S. Cl. .................................... 375/316
(58) Field of Classification Search ............... 375/316, 375/130, 147, 148, 371, 260; 370/334, 335
See application file for complete search history.

(56) References Cited

U.S. PATENT DOCUMENTS

| | | | |
|---|---|---|---|
| 5,509,020 | A | 4/1996 | Iwakiri et al. |
| 5,933,421 | A | 8/1999 | Alamouti |
| 6,377,607 | B1 | 4/2002 | Ling et al. |
| 6,459,728 | B1 | 10/2002 | Bar-David et al. |
| 6,560,209 | B1 | 5/2003 | Alamouti |
| 6,614,857 | B1 | 9/2003 | Buehrer et al. |
| 6,654,429 | B1 | 11/2003 | Li |
| 6,763,059 | B2 * | 7/2004 | Suzuki et al. ............... 375/148 |
| 6,768,713 | B1 | 7/2004 | Siala et al. |
| 6,853,629 | B2 | 2/2005 | Alamouti |
| 7,027,519 | B2 | 4/2006 | Bao |
| 7,092,436 | B2 | 8/2006 | Ma et al. |
| 7,376,176 | B2 * | 5/2008 | Zhao et al. .................. 375/148 |
| 7,489,731 | B2 * | 2/2009 | Coulson et al. ............. 375/260 |
| 2001/0004390 | A1 | 6/2001 | Pukkila et al. |
| 2002/0150037 | A1 | 10/2002 | Bao et al. |
| 2003/0147476 | A1 | 8/2003 | Ma |
| 2003/0156570 | A1 | 8/2003 | Alamouti |
| 2003/0210750 | A1 | 11/2003 | Onggosanusi |
| 2004/0009781 | A1 | 1/2004 | Andrews |
| 2004/0086055 | A1 | 5/2004 | Li |
| 2004/0264561 | A1 | 12/2004 | Alexander et al. |
| 2005/0180349 | A1 | 8/2005 | Alamouti et al. |
| 2005/0207477 | A1 | 9/2005 | Monsen |
| 2006/0209732 | A1 | 9/2006 | Gorokhov |

FOREIGN PATENT DOCUMENTS

WO       WO2005046151       5/2005

OTHER PUBLICATIONS

International Search Report for PCT/US2008/56709 mailed Jun. 30, 2008.

* cited by examiner

*Primary Examiner*—Khai Tran
(74) *Attorney, Agent, or Firm*—Sheppard Mullin Richter & Hampton LLP

(57) ABSTRACT

A system and method of transmitting and processing pilot signals includes decorrelating a pilot tone that conveys a pilot signal, performing a channel estimation based on the decorrelated pilot tone to calculate estimated channel values and positioning the estimated channel values consistent with their order in subsequent transmission units. In one embodiment, the decorrelation comprises an interleaving operation. In another embodiment, the decorrelation occurs during a channel estimation stage. The decorrelation can be performed during a channel estimation stage by interleaving and deinterleaving pilot signals in the receiver.

31 Claims, 7 Drawing Sheets

METHODS AND SYSTEMS FOR TRANSMITTING AND PROCESSING PILOT SIGNALS

TECHNICAL FIELD

The present invention relates generally to wireless communication, and more particularly, some embodiments relate to systems and methods for channel estimation.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks.

Architects of these and other networks, and indeed communications channels in general, have long struggled with the challenge of managing multiple communications across a limited channel. For example, in some environments, more than one device may share a common carrier channel and thus run the risk of encountering a communication conflict between the one or more devices on the channel.

Over the years, network architects have come up with various solutions to arbitrate disputes or otherwise delegate bandwidth among the various communicating devices, or clients, on the network. Schemes used in well known network configurations such as token rings, Ethernet, and other configurations have been developed to allow sharing of the available bandwidth. In addition to these schemes, other techniques have been employed, including for example CDMA (code division multiple access) and TDMA (time division multiple access) for cellular networks.

FDM ("Frequency Division Multiplexing") is a technology that enables multiple devices to transmit their signals simultaneously over a communication channel in a wired or wireless setting. The devices' respective signals travel within their designated frequency band (carrier), onto which the data (text, voice, video, or other data) is modulated. With adequate separation in frequency band spacing, multiple devices can simultaneously communicate across the same communication channel (network or point-to-point).

Orthogonal Frequency-Division Multiplexing ("OFDM") is one example wireless communication system. OFDM is a digital multi-carrier modulation scheme that uses a large number of orthogonal sub-carriers that are closely spaced together in frequency. Each sub-carrier carrier can be modulated using some conventional modulation scheme. The conventional modulation scheme might use a lower symbol rate relative to while still maintaining a data rate that might be similar to a conventional single-carrier modulation scheme that uses the same bandwidth. OFDM spread spectrum systems distribute data over a plurality of carriers that are spaced apart at precise frequencies. The spacing is chosen so as to provide orthogonality among the carriers.

The advantages of OFDM systems might include: (1) Adaptability to sever channel conditions without complex equalization, (2) Robustness against narrow-band co-channel interference, (3) Robustness against intersymbol interference (ISI) and fading caused by multipath propagation, (4) High spectral efficiency, (5) Efficient implementation using Fast Fourier Transform ("FFT"), (6) Low sensitivity to time synchronization errors, (7) Unlike FDM, tuned sub-channel receiver filters are not required, and (8) Facilitation of single frequency networks.

Information transmitted over wireless networks is susceptible to various factors which can cause degradation of the signal. Wireless communication devices may transmit signals via one or more paths. For example, a transmitted signal may travel over two paths. The first path is initial path and a second path, which is caused by reflection off an obstruction by the initial signal. Without compensating systems, this type of interference is characteristic of the transmission of signals along multiple paths in a multi-carrier communication system. Often this may result is degradation and fluctuation of signals on a given channel.

To ameliorate this effect, systems will typically employ channel estimation for mitigating the effects of signal fluctuation. A wireless device may, for example, use a computed transfer function to operate on the signal to compensate for malignant effects. Channel estimation can be used to further improve data transmission performance. Two types of channel estimation might be used: decision-directed and pilot-symbol-aided channel estimation.

In pilot-symbol-aided channel estimation the pilot signal might be made up of pilot symbols that are know in advance by both the transmitter and receiver. Accordingly, the receiver can estimate the channel response based on the received signals and the known signals that the receiver expects to receive.

In one example, the WiMedia physical layer standard (WiMedia PHY) calls for six channel estimation (CE) symbols to be transmitted in each packet. The packet contains three segments, a preamble, a PLCP header segment and a PSDU segment. The preamble is divided among a packet/frame synchronization (PFS) sequence and a channel estimation (CE) sequence. The preamble contains 24 PFS symbols and six CE symbols. In another example, the packet is a burst packet and may contain 12 PFS symbols and six CE symbols.

In general, the greater the number of symbols available, the more reliable are the channel estimates and the determination of carrier frequency offsets. For packets that are transmitted via frequency hopped signals or frequency-domain spreading, the number of symbols for yielding reliable channel estimates for specific bands is taxed by virtue of the plurality of bands. For example, in a WiMedia physical layer standard that specifies transmitting packets containing six CE symbols in a hopping pattern of three frequency bands, each band will effectively only have two CE symbols for channel estimation. In comparison, a packet sent via a non-hopped signal with six CE symbols allows for a channel estimate based on six CE symbols for a given frequency band.

BRIEF SUMMARY OF EMBODIMENTS OF THE INVENTION

Generally, non-blind channel estimation uses pilot tones that convey known pilot symbols, and can be performed either in the time or frequency domain; in systems like OFDM, it can be based on all-pilot OFDM symbols, or on OFDM symbols that contain pilots interspersed with data. According to various embodiments of the invention, the channel samples probed, or observed, via the pilot tones can be decorrelated for the purpose of channel estimation. In one embodiment, decorrelation can be accomplished by a pilot interleaving operation at the transmitter. For example, pilot tones transmitted in an ultra-wideband ("UWB") preamble can be interleaved at the transmitter in order to subsequently decorrelate the channel samples to be estimated by the receiver-after appropriately deinterleaving the observations-thereby aiding the receiver in channel estimation. In such an embodiment, during the channel estimation stage, the deinterleaving operation at the receiver, can be used to undo the pilot interleaving performed at the transmitter. This may make the channel appear to exhibit little correlation between samples separated from one another by a given lag, or spacing.

In one embodiment, due to the decorrelation between channel samples induced by (de)interleaving, a channel estimation algorithm that requires a priori knowledge about the channel's statistics can be implemented in a receiver by using a generic correlation matrix as a priori information about channel statistics—e.g., instead of the actual correlation matrix, or an estimate thereof. In one embodiment, the generic correlation matrix—substituted for the actual channel correlation matrix or its estimate—can be, for example, a correlation matrix corresponding to a uniform power delay profile associated with the largest root mean square excess delay among all foreseen channel modes relevant to the deployed system. After estimation, the estimated channel values, or samples, can be appropriately positioned, consistent with their order in subsequent transmission units where the channel estimates are to be used. In other words, the channel estimates should be ordered such that they are relevant to payload OFDM symbols transmitted over the channel at about the same time as a given channel estimation symbol, which can consist of pilot symbols.

In another embodiment, it might be possible to decorrelate the frequency domain channel samples (e.g., tones in an OFDM system) during the channel estimation stage at the receiver, in the absence of pilot interleaving at the transmitter. For example, in one embodiment of an OFDM receiver, decorrelating the frequency domain channel samples can be accomplished by interleaving and deinterleaving the pilot signals observed at the receiver, while running a channel estimation algorithm that requires a priori knowledge about the channel's statistics—e.g., a linear minimum mean squared error ("LMMSE") algorithm. LMMSE algorithms are discussed in more detail in O. Edfors et al., OFDM CHannel Estimation by Singular Value Decomposition, IEEE Trans. Commun., vol. 46, pp. 931-939, July 1998, incorporated herein by reference in its entirety. The interleaving operation at the receiver may, in many cases, make the channel appear to exhibit little correlation between samples separated from one another by a given lag, or spacing. The receiver's channel estimation algorithm can use a generic correlation matrix as a priori information about channel statistics—e.g., instead of the actual correlation matrix, or an estimate thereof. In one embodiment, the generic correlation matrix—substituted for the actual channel correlation matrix or its estimate—can be, for example, a correlation matrix corresponding to a uniform power delay profile associated with the largest root mean square excess delay among all foreseen channel modes relevant to the deployed system. After estimation, the estimated channel values, or samples, can be appropriately positioned, consistent with their order in subsequent transmission units where the channel estimates are to be used. In other words, the channel estimates should be ordered such that they are relevant to payload OFDM symbols transmitted over the channel at about the same time as a given channel estimation symbol, which can consist of pilot symbols.

The methods and systems described herein might be applied to other communication systems, in addition to OFDM. For example, in one embodiment other ultra-wideband ("UWB") communication system could use the methods and systems described herein. In another embodiment, a 60 GHz system could use the methods and systems described herein.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
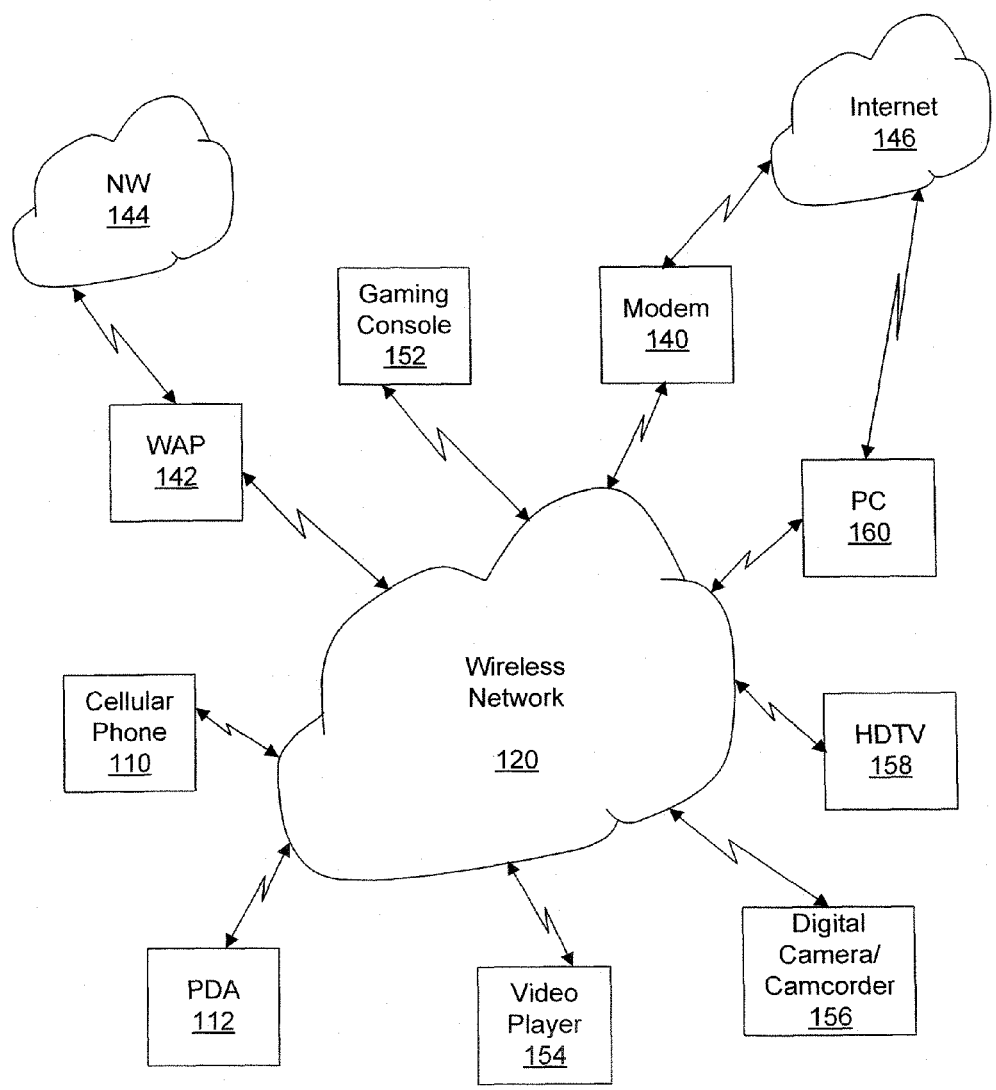
FIG. 1 is a block diagram illustrating one possible configuration of a wireless network that might serve as an example environment in which the present invention might be implemented.

The figures are not intended to be exhaustive or to limit the invention to the precise form disclosed. It should be understood that the invention might be practiced with modification and alteration, and that the invention be limited only by the claims and the equivalents thereof.

DETAILED DESCRIPTION OF THE EMBODIMENTS OF THE INVENTION

In one embodiment of the invention, for example, an OFDM system can apply the concept of interleaving and transmitting symbols to the pilot tones that convey pilot symbols in order to decorrelate, for the purpose of channel estimation, the channel samples probed, or observed, via pilot tones. For example, in one embodiment decorrelation can be accomplished by a pilot interleaving operation at the transmitter. For example, pilot tones transmitted in an ultra-wideband ("UWB") preamble can be interleaved at the transmitter in order to subsequently decorrelate the channel samples to be estimated by the receiver—after appropriately deinterleaving the observations—thereby aiding the receiver in channel estimation. In such an embodiment, during the channel estimation stage, the deinterleaving operation at the receiver, required in order to undo the pilot interleaving performed at the transmitter, will, in many cases make the channel appear to exhibit little correlation between samples separated from one another by a given lag, or spacing.

Due to the decorrelation between channel samples induced by (de)interleaving, a channel estimation algorithm that requires a priori knowledge about the channel's statistics can be implemented in a receiver by using a generic correlation matrix as a priori information about channel statistics—e.g., instead of the actual correlation matrix, or an estimate thereof. The generic correlation matrix—substituted for the actual channel correlation matrix or its estimate—can be, for example, a correlation matrix corresponding to a uniform power delay profile associated with the largest root mean square excess delay among all foreseen channel modes relevant to the deployed system. After estimation, the estimated channel values, or samples, can be appropriately positioned, consistent with their order in subsequent transmission units where the channel estimates are to be used. In other words, in one embodiment, the channel estimates should be ordered such that they are relevant to payload OFDM symbols transmitted over the channel at about the same time as a given channel estimation symbol.

In another embodiment the invention might be implemented by decorrelating the frequency domain channel samples (e.g., tones in an OFDM system) during the channel estimation stage at the receiver, in the absence of pilot interleaving at the transmitter. For example, in one embodiment of an OFDM receiver, decorrelating the frequency domain channel samples can be accomplished by interleaving and deinterleaving the pilot symbols observed at the receiver, while running a channel estimation algorithm that requires a priori knowledge about the channel's statistics—e.g., a linear minimum mean squared error ("LMMSE") algorithm. The interleaving operation at the receiver will, in many case, make the channel appear to exhibit little correlation between samples separated (from one another) by a given lag, or spacing. The receiver's channel estimation algorithm can use a generic correlation matrix as a priori information about channel statistics—e.g., instead of the actual correlation matrix, or an estimate thereof. In one embodiment, the generic correlation matrix—substituted for the actual channel correlation matrix or its estimate—can be, for example, a correlation matrix corresponding to a uniform power delay profile associated with the largest root mean square excess delay among all foreseen channel modes relevant to the deployed system. After estimation, the estimated channel values, or samples, can be appropriately positioned, consistent with their order in subsequent transmission units where the channel estimates are to be used. In other words, in one embodiment, the channel estimates should be ordered such that they are relevant to payload OFDM symbols transmitted over the channel at about the same time as a given channel estimation symbol, which can consist of pilot symbols. The methods and systems described herein can be applied to other communication systems, in addition to OFDM. For example, in one embodiment an ultrawideband ("UWB") communication system can use the methods and systems described herein. In another embodiment, a 60 GHz system can use the methods and systems described herein.

Before describing the invention in detail, it is useful to describe an example environment in which the invention might be implemented. One such example is a wireless network in which multiple electronic devices (for example, computers and computing devices, cellular telephones, personal digital assistants, motion and still cameras, among others) might communicate and share data, content and other information with one another. From time-to-time, the present invention is described herein in terms of a network of multiple devices such as a wireless USB connection. Description in terms of this environment is provided to allow the various features and embodiments of the invention to be portrayed in the context of an exemplary application. After reading this description, it will become apparent to one of ordinary skill in the art how the invention might be implemented in different and alternative environments. Indeed, applicability of the invention is not limited to a wireless USB connection. The systems and methods described herein might be applied to other wireless standards, such as Bluetooth, Wibree, WirelessHD, ZigBee, Cypress Semiconductor "WirelessUSB", and other wireless standards.

FIG. 1 is a block diagram illustrating one possible configuration of a wireless network that might serve as an example environment in which the present invention might be implemented. Referring now to FIG. 1, a wireless network 120 is provided to allow a plurality of electronic devices to communicate with one another without the need for wires or cables between the devices. A wireless network 120 might vary in coverage area depending on a number of factors or parameters including, for example, the transmit power levels and receive sensitivities of the various electronic devices associated with the network. Examples of wireless networks might include the various IEEE and other standards as described above, as well as other wireless network implementations. The wireless network 120 might be, for example, a wireless USB connection, a Bluetooth connection, a Wibree connection, a WirelessHD connection, a ZigBee connection, a Cypress Semiconductor "WirelessUSB" connection, or other wireless connection.

With many applications, the wireless network 120 operates in a relatively confined area, such as, for example, a home or an office. The example illustrated in FIG. 1 is an example of an implementation such as that which might be found in a home or small office environment. Of course wireless communication networks and communication networks in general are found in many environments outside the home and office as well. In the example illustrated in FIG. 1, wireless network 120 includes a communication device to allow it to communicate with external networks. More particularly, in the illustrated example, wireless network 120 includes a modem 140 to provide connectivity to an external network such as the Internet 146, and a wireless access point 142 that might provide external connectivity to another network 144.

Also illustrated in the example wireless network 120 are portable electronic devices such as a cellular telephone 110 and a personal digital assistant ("PDA") 112. Like the other electronic devices illustrated in FIG. 1, cellular telephone 110 and PDA 112 might communicate with wireless network 120 via the appropriate wireless interface. Additionally, these devices might be configured to further communicate with an external network. For example, cellular telephone 110 is typically configured to communicate with a wide area wireless network by way of a base station.

Additionally, the example environment illustrated in FIG. 1 also includes examples of home entertainment devices connected to wireless network 120. In the illustrated example, electronic devices such as a gaming console 152, a video player 154, a digital camera/camcorder 156, and a high definition television 158 are illustrated as being interconnected via wireless network 120. For example, a digital camera or camcorder 156 might be utilized by a user to capture one or more still picture or motion video images. The captured images might be stored in a local memory or storage device associated with digital camera or camcorder 156 and ultimately communicated to another electronic device via wireless network 120. For example, the user might wish to provide a digital video stream to a high definition television set 158 associated with wireless network 120. As another example, the user might wish to upload one or more images from digital camera 156 to his or her personal computer 160 or to the Internet 146. This might be accomplished by wireless network 120. Of course, wireless network 120 might be utilized to provide data, content, and other information sharing on a peer-to-peer or other basis, as the provided examples serve to illustrate.

Also illustrated is a personal computer 160 or other computing device connected to wireless network 120 via a wireless air interface. As depicted in the illustrated example, personal computer 160 might also provide connectivity to an external network such as the Internet 146.

In the illustrated example, wireless network 120 is implemented so as to provide wireless connectivity to the various electronic devices associated therewith. Wireless network 120 allows these devices to share data, content, and other information with one another across wireless network 120. Typically, in such an environment, the electronic devices would have the appropriate transmitter, receiver, or transceiver to allow communication via the air interface with other devices associated with wireless network 120. These electronic devices might conform to one or more appropriate wireless standards and, in fact, multiple standards might be in play within a given neighborhood. Electronic devices associated with the network typically also have control logic configured to manage communications across the network and to manage the operational functionality of the electronic device. Such control logic might be implemented using hardware, software, or a combination thereof. For example, one or more processors, ASICs, PLAs, and other logic devices or components might be included with the device to implement the desired features and functionality. Additionally, memory or other data and information storage capacity might be included to facilitate operation of the device and communication across the network.

Electronic devices operating as a part of wireless network 120 are sometimes referred to herein as network devices, members or member devices of the network or devices associated with the network. In one embodiment devices that communicate with a given network might be members or merely in communication with the network.

Generally, in a wireless USB connection one device might be referred to as a wireless USB host, or just "host;" while another might be referred to as a wireless USB device, an "external device" or just "device." A wireless USB device might be, for example, any device that might be connected to a computer or other device, such as a printers, cameras, camcorders, PDA's, cellular phones, video players, HDTV's, modems, keyboards, mice, etc. This list is not intended to be exhaustive. A wireless USB host might be any device that might be connected to a USB device. For example, a computer might be a wireless USB host. It will be understood, however, that devices, such as cellular phones, might be wireless USB hosts in some cases. When referring to both a wireless USB host and a wireless USB device the term "devices" might be used. The term "external device" is intended to differentiate a wireless USB device from a wireless USB host. In general an external device will be physically external, e.g., not inside of a wireless USB host, however, the use of this term is not intended to limit wireless USB devices such that they must be external to the wireless USB host.

Several examples of the systems and methods described herein are illustrated using examples that include wireless USB communication. It will be understood that the systems and methods described herein might be used in conjunction with other wireless communication standards. Thus, the terms "host", "external device," "device," "devices," etc. might refer to devices, systems, or components that implement these other wireless communication standards. Thus, for example, the term "host" might be used to describe a computer that uses, for example, the Bluetooth standard to communicate with an external device such as a mobile telephone, PDA, external hard drive, etc.

In one embodiment, a WiMedia platform might communicate only with devices that are within range. A WiMedia platform might include a device that has a WiMedia Medium Access Control ("MAC") and a WiMedia physical layer. To extend the typically short range of a WiMedia device using multi-hop communication, a routing protocol might be used to route packets from a source to a destination. This routing of packets might be via multiple intermediate devices, for example. In one embodiment a routing protocol that operates at layer 2 (e.g., the MAC layer) might be used. A routing protocol that operates at layer 2 might be transparent to upper layers—for example, the Internet Protocol ("IP") layer. In this way modifications to the upper layer might be avoided while still allowing multiple hop communication for WiMedia-based devices. In one embodiment, for layer 3 of a device, devices that are several hops away might appear as "neighbors," for example, on the same segment (e.g., as if they are all on the same Ethernet).

Figure 2:
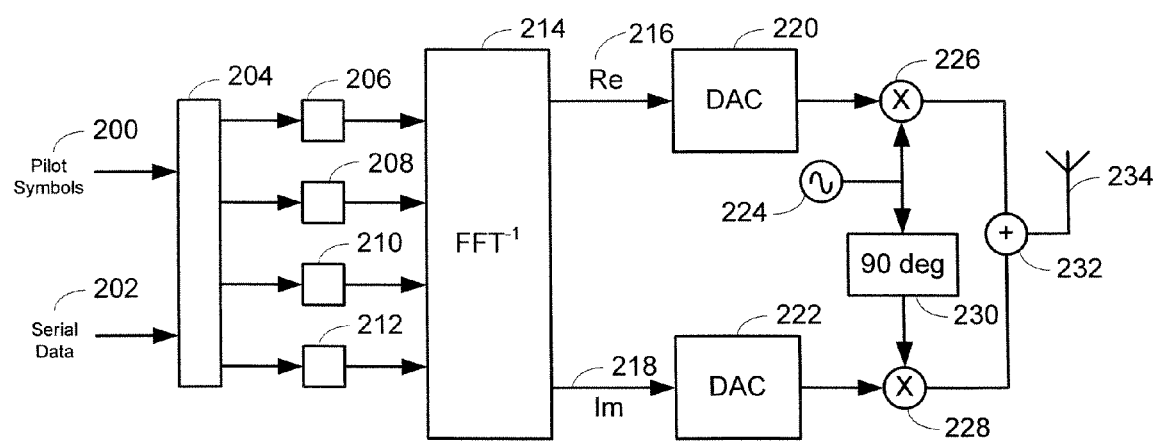
FIG. 2 is a diagram illustrating an example OFDM transmitter.

FIG. 2 is a diagram illustrating an example OFDM transmitter. Pilot symbols 200 and serial data 202 can be transmitted using the OFDM transmitter. A serial-to-parallel converter 204 might convert the serial data 202 into parallel data for transmission by the OFDM transmitter. Unlike typical serial-to-parallel converters, however, serial-to-parallel converter 204 might also insert pilot signals for transmission of pilot symbols interspersed with data; this is sometimes referred to in the art as pilot symbol aided modulation (PSAM).

For example, according to various embodiments of the invention the channel samples probed, or observed, via the pilot tones that convey pilot signals can be decorrelated for the purpose of channel estimation. Decorrelation can be accomplished by a pilot interleaving operation at the transmitter. For example, pilot tones transmitted by the OFDM transmitter can be interleaved at the transmitter in order to subsequently decorrelate the channel samples to be estimated by the receiver—after appropriately deinterleaving the observations-thereby aiding the receiver in channel estimation. The deinterleaving operation at the receiver, required in order to undo the pilot interleaving performed at the transmitter, will, in many cases make the channel appear to have little correlation between samples separated from one another by a given lag, or spacing.

In one embodiment, due to decorrelation between channel samples induced by (de)interleaving, a channel estimation algorithm that requires a priori knowledge about the channel's statistics can be implemented in a receiver by using a generic correlation matrix as a priori information about channel statistics—e.g., instead of the actual correlation matrix, or an estimate thereof. In one embodiment, the generic correlation matrix—substituted for the actual channel correlation matrix or its estimate—can be, for example, a correlation matrix corresponding to a uniform power delay profile associated with the largest root mean square excess delay among all foreseen channel modes relevant to the deployed system. After estimation, the estimated channel values, or samples, can be appropriately positioned, consistent with their order in subsequent transmission units where the channel estimates are to be used. In other words, in one embodiment, the channel estimates should be ordered such that they are relevant to payload OFDM symbols transmitted over the channel at about the same time as a given channel estimation symbol, which can consist of pilot symbols.

In another embodiment, it might be possible to decorrelate the frequency domain channel samples (e.g., tones in an OFDM system) during the channel estimation stage at the receiver, in the absence of pilot interleaving at the transmitter. For example, in one embodiment decorrelating the frequency domain channel samples can be accomplished by interleaving and deinterleaving the pilot signals observed at the receiver, while running a channel estimation algorithm that requires a priori knowledge about the channel's statistics—e.g., a linear minimum mean squared error ("LMMSE") algorithm. The interleaving operation at the receiver will, in many cases make the channel appear to exhibit little correlation between samples separated from one another by a given lag, or spacing. The receiver's channel estimation algorithm can use a generic correlation matrix as a priori information about channel statistics—e.g., instead of the actual correlation matrix, or an estimate thereof. In one embodiment, the generic correlation matrix—substituted for the actual channel correlation matrix or its estimate—can be, for example, a correlation matrix corresponding to a uniform power delay profile associated with the largest root mean square excess delay among all foreseen channel modes relevant to the deployed system. After estimation, the estimated channel values, or samples, can be appropriately positioned, consistent with their order in subsequent transmission units where the channel estimates are to be used. In other words, in one embodiment, the channel estimates should be ordered such that they are relevant to payload OFDM symbols transmitted over the channel at about the same time as a given channel estimation symbol, which can consist of pilot symbols. The methods and systems described herein can be applied to other communication systems, in addition to OFDM. For example, in one embodiment an ultrawideband ("UWB") communication system can use the methods and systems described herein. In another embodiment, a 60 GHz system can use the methods and systems described herein.

In one embodiment an OFDM carrier signal might be the sum of a number of orthogonal sub-carriers, with baseband data such as pilot symbols 200 and serial data 202 on each sub-carrier being independently modulated. In one embodiment some type of quadrature amplitude modulation ("QAM") or phase-shift keying ("PSK") might be used. In one embodiment this composite baseband signal might be used to modulate a main RF carrier.

Once the serial data 202 and the pilot symbols 200 have been converted into a parallel form, constellation mapping can occur. For example, each parallel data stream might be mapped to a symbol stream using some constellation mapping such as QAM, M-PSK, etc. An inverse FFT might be computed on each set of symbols. This converts the symbols to a set of time domain samples. These time domain samples might be quadrature-mixed to a passband. In one embodiment real 216 and imaginary 218 components might be converted to the analog domain using digital-to-analog converters 220 and 222. The analog signals might then be used to modulate on a carrier signal supplied by a frequency generator 224. The analog versions of the real 216 and imaginary 218 components can be transmitted 90 degrees out of phase by changing the phase of the carrier 90 degrees using a 90 degree phase adjuster 230. The modulated signals might be quadrature-mixed up from base band using mixers 226 and 228. The signals might then be added using summer 232 and transmitted over antenna 234.

Figure 3:
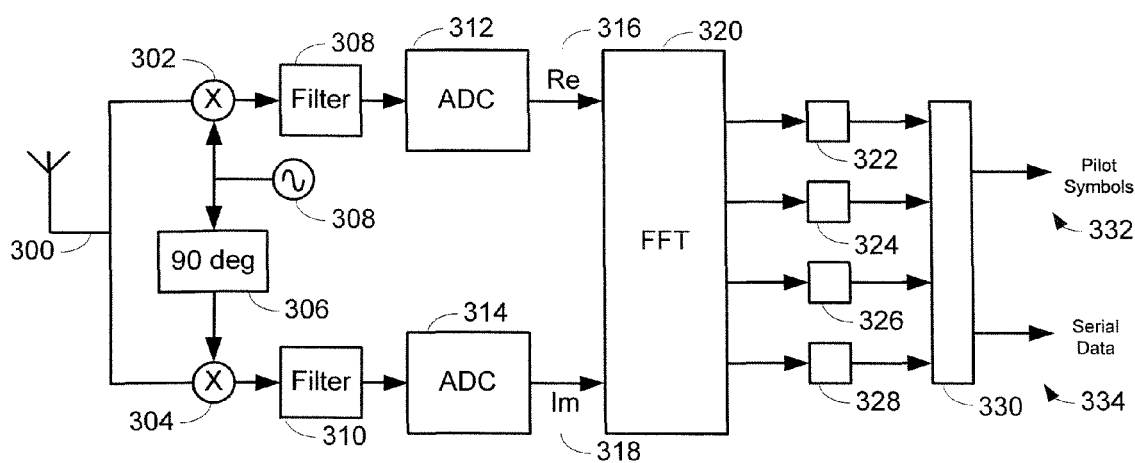
FIG. 3 is a diagram illustrating an example OFDM receiver.

It will be understood by those of ordinary skill in the art that the transmitter of FIG. 2 and the receiver of FIG. 3 are simplified examples of transmitters and receivers that might be implemented using the systems and methods described herein. Other, more complicated OFDM transmitters and receivers as well as other types of transmitters and receivers, such as, for example, UWB and 60 GHz transmitters, or Digital Video Broadcasting (DVB), be it terrestrial or handheld (DVB-T or DVB-H), or other transmiters and receivers can be used.

FIG. 3 is a diagram illustrating an example OFDM receiver. A radio frequency ("RF") transmission can be received by OFDM receiver using antenna 300. For example, a transmission from the transmitter of FIG. 2 can be received at antenna 300. The received signal might then be quadrature-mixed down to baseband using mixers 302 and 304 in conjunction with frequency source 308 and 90 degree phase shifter 306. The signals might then be filtered using filters 308 and 310 before analog-to-digital converting the real 316 and imaginary 318 parts of the receive signal using analog-to-digital converters 312 and 314. The filter might be required because mixing will also create signals centered at 2 times the frequency of frequency source 308.

It will be understood by those of skill in the art that if the analog-to-digital converters 312 and 314 operate at a high enough frequency, in one embodiment, the filters might not be necessary. (For example the filters might not be necessary if the analog-to-digital converters operate at a frequency of at least 4 times the frequency of frequency source 308.)

Forward FFT 320 might then be used to convert back to the frequency domain. Symbol detectors 322, 324, 326, and 328 might then be used to convert to a binary data stream. This binary data stream can then be converted to serial data 334 and pilot symbols 322 using parallel-to serial converter 330. (This is basically the inverse operation of the corresponding components of FIG. 2.) The interleaved pilot symbols can then be used for channel estimation, after appropriate timing and frequency synchronization algorithms are employed.

Some embodiments of the systems and methods described herein might show significant improvement of LMMSE channel estimation relative to low-pass filtered LS channel estimation. Additionally, some embodiments of the systems and methods described herein might show essentially the same performance in channels with small root mean squared excess delay. Accordingly, some embodiments the LMMSE estimation might potentially produce improvements in channels with large root mean square excess delay, with little or no performance loss in channels with small root mean square delay.

The discussion that follows includes a mathematical analysis of one embodiment of LMMSE channel estimation, including the reduced rank version known in the art. This analysis also includes computer simulations of LMMSE channel estimation.

In estimation theory, the objective is often to minimize the mean-squared error (MSE) in estimating a vector x from a measurement (set of observations) y; the conditional mean estimator minimizes the MSE of the estimate x̂ of x regardless of the joint distribution of the estimation object x and the observations (measurement) y. Moreover, the conditional mean estimator (e.g., the estimator given as the conditional mean of x) is a linear function of the observation y when x and y are jointly normal (Gauss-Markov theorem). Inspired by this fundamental reality it makes sense to consider the class of linear minimum mean-squared estimators, where the estimator x̂ of x is sought among the linear combinations of the observations in y, e.g. it is a linear function of y—whether or not x and y are jointly normal. The theory leads to the Wiener Hopf equations as the equations whose solution is the LMMSE estimator; the Wiener Hopf equations are found to arise from a basic orthogonality principle that simplifies the characterizations of LMMSE estimators. The theory lends itself to low rank adaptive Wiener filtering, linear prediction, as well as Kalman filtering and quantizers.

Channel estimation can be modeled as a LMMSE problem, particularly for OFDM systems where the channel is defined in the frequency domain as Rayleigh fading arising from frequency selectivity. The Wiener estimator is a linear minimum mean square error (MMSE) estimator, which is also the optimum MMSE estimator when the relevant probability densities are Gaussian. In general, the Wiener estimator refers to the problem of estimating the samples of a complex discrete stochastic process denoted y[/l] or simply yl. For example, OFDM leads to a discrete model whereby the frequency domain channel observations in AWGN, over one or more OFDM symbols, are $$r_{kl} = \sqrt{\frac{T}{T}} c_{kl} s_{kl} + n_{kl}. \tag{1}$$

In (1), $c_{kl}$ are complex fading coefficients of the discrete time-frequency channel with frequency index k and time index l; the time index is associated with the time domain realization of an OFDM symbol. While this is a two-dimensional stochastic process, the treatment of the frequency and time dimensions can be done separately, or the frequency and time indices can be multiplexed in a manner similar to a parallel to serial conversion in order to work with only one, abstract index. Then the problem reduces to estimating samples yl of some one-dimensional process, based on measurements $x_m$ of the process, which in turn are samples of another stochastic process; e.g., the measurements $x_m$ can be some noisy channel measurements at the pilot positions.

Note the different index notations for yl and $x_m$, which accounts for the fact that a one to one correspondence between the samples to be estimated and the measurement samples may not exist. This is the case when there are less pilot samples than there are samples to be estimated, which corresponds in particular to the known scenario called pilot symbol assisted modulation (PSAM). Alternatively, one OFDM symbol may be dedicated completely to pilots needed to estimate the channel, and in this case there is one pilot symbol for each channel' sample to be estimated, e.g. a one to one correspondence between the samples to be estimated and the measurement samples exists. Subsequent OFDM symbols that contain both data subcarriers and pilot symbols will follow, which could be used for tracking the frequency domain channel changes after the initial estimation based on dedicated OFDM symbols; an initial solution could be obtained in the frequency dimension, followed by another estimation in the time dimension-thereby separating the two dimensional problem in two one dimensional ones. The general case will be treated next, where one abstract index is used, and a one to one correspondence between the samples to be estimated and the measurement samples is not assumed.

A linear estimate is sought, whereby:

$$\hat{y}_l = \sum_m b_{lm} x_m; \tag{2}$$

Further, it is assumed that only a finite number L of samples need to be estimated from M measurements, that is, the estimate is sought in a linear vector space spanned by the random variables $x_l, \ldots x_M$ (8I.E., an M-dimentional hyperplane). Then the linear estimate can be written as $$\hat{y} = Bx \tag{3}$$

Note that vectors are random variables, and the inner product is defined by a Lebesgue measure induced by the joint p.d.f. of the r.v.s. having realizations $e_l, x_m$.

Let $e_l = y_l - \hat{y}_l$ be the error at each sample; the objective is to minimize the mean square error for each sample, $$E\{|e_l|^2\} = \min, \forall l = 1, \ldots, L. \tag{4}$$

By the orthogonally principle (projection theory) this is equivalent to $E\{e_l x^*_m\} = 0$, $\forall l, m$. This is clearly accomplished if each sample $\hat{y}_l$ is simply the orthogonal projection of the (unknown) sample $y_l$ (a random variable, or vector) spaced generated by $x_l, \ldots, x_M$. This obviously guarantees that $e_l = y_l - \hat{y}_l$ is orthogonal to every vector (r.v.) $x_m$. Clearly, (2) can be written as $$E\{ex^H\} = 0, \tag{5}$$

which mandates that the L×M cross correlation matrix between the error vector and the measurement vector vanishes. Letting e=y−ŷ one obtains after a simply manipulation $$E\{yx^H\} = E\{Bxx^H = 0.\} \tag{6}$$

The Wiener equation $$R_{yx} = BR_{xx} \tag{7}$$

is solved by letting $$B = R_{yx} R_{xx}^{-1}, \tag{8}$$

where $$R_{xx} = E\{xx^H\}, \tag{9}$$

$$R_{yx} = E\{yx^H\}. \tag{10}$$

In order to evaluate the estimation error it is useful to examine the autocorrelation matrix $R_{ee}$ of the error vector e $$R_{ee} = E\{(y-\hat{y})(y-\hat{y})^H\}; \tag{11}$$

Using (3), (10), (9) it follows that $$R_{ee} = R_{yy} - B - R_{yx}^H - (R_{yx} - BR_{xx})B^H \tag{12}$$

which can be reduced via (8) to $$R_{ee} = R_{yy} - BR_{yx}^H \tag{13}$$

The total estimation error is $\|e\|^2 = \text{tr } R_{ee}$.

Note that as a correlation matrix (actually, covariance when y has zero mean), $R_{xx}$ is not only Hermitian but also positive semidefinite. Additionally, if x is a column vector, the correlation matrix $E\{xx^H\}$ is Hermitian because the argument of the expectation operator is Hermitian, via $(xx^H)^H = xx^H$, and expectation preserves the conjugate transition symmetry. Thereby, there exists a unique, positive semidefinite Hermitian matrix $R_{xx}^{1/2}$ such that $R_{xx}^{1/2} R_{xx}^{1/2} = R_{xx}$; in addition if $R_{xx}$ is positive definite, then $(R_{xx}^{1/2})^{-1} = (R_{xx}^{-1})^{1/2}$. Clearly $R_{xx}^{-1/2}$ is Hermitian, too.

More insight can be derived when the relevant entities are specialized for the channel estimation problem. In this case, the process to be estimated is the channel, and the vector y is a vector h of channel samples to be estimated. The elements of the measurement vector x are the least squares (LS) estimates of the channel, denoted $\hat{h}_{LS}$. Then, the Wiener-Hopf LMMSE solution (8) becomes, in the new notation, $$\hat{h}_{LMMSE} = R_{h\hat{h}_{LS}} R_{\hat{h}_{LS}\hat{h}_{LS}}^{-1} \hat{h}_{LS} \qquad (14)$$

This is a general LMMSE channel estimation solution, irrespective of whether or not there are as many samples to be estimated as there are measurement samples, e.g. whether or not L=M; as noted above, the case when M<L is sometimes referred to as PSAM.

Note also that, for the channel estimation problem, the error autocorrelation matrix can be rewritten as $$R_{ee} = R_{hh} - R_{h\hat{h}_{LS}} R_{\hat{h}_{LS}\hat{h}_{LS}}^{-1} R_{h\hat{h}_{LS}}^H \stackrel{(a)}{=} R_{hh} - R_{\hat{h}_{LMMSE}h} \qquad (15)$$

where eq. (a) follows from $$R_{\hat{h}_{LMMSE}h} = E\{\hat{h}_{LMMSE} h^H\} \qquad (16)$$

$$= E\{R_{h\hat{h}_{LS}} R_{\hat{h}_{LS}\hat{h}_{LS}}^{-1} \hat{h}_{LS} h^H\} \qquad (17)$$

$$= R_{h\hat{h}_{LS}} R_{\hat{h}_{LS}\hat{h}_{LS}}^{-1} E\{\hat{h}_{LS} h^H\} \qquad (18)$$

$$= R_{h\hat{h}_{LS}} R_{\hat{h}_{LS}\hat{h}_{LS}}^{-1} E\{(h\hat{h}_{LS}^H)\}^H \qquad (19)$$

$$= R_{h\hat{h}_{LS}} R_{\hat{h}_{LS}\hat{h}_{LS}}^{-1} R_{h\hat{h}_{LS}}^H. \qquad (20)$$

Eq. (15) is consistent with the well-known interpretation of the residual estimation error of a LMMSE estimator for a zero mean random parameter; the trace of $R_{hh}$ is an upper bound on the estimation error, and would be achieved when the algorithm would do nothing, e.g. would completely ignore the observation data by setting the estimate to zero. The second term is responsible for the reduction in overall estimation error due to relying on the LMMSE algorithm, instead of ignoring the observations and setting the channel estimates to zero. What is not obvious is how exactly the eigenvalues of $R_{\hat{h}_{LMMSE}h}$ (the only ones which the algorithm can control, as the eigenvalues of $R_{hh}$ are outside its influence) affect the trace of the difference matrix $R_{hh} - R_{\hat{h}_{LMMSE}h}$. (Only if $R_{hh}$ and $R_{\hat{h}_{LMMSE}h}$ commuted with each other could one claim that the eigenvalues of the difference matrix are differences of certain paired eigenvalues.)

In order to evaluate how the eigenvalues of $R_{\hat{h}_{LMMSE}h}$ affect the eigenvalues of $R_{ee}$, and its trace, note that there exists a unique $R_{\hat{h}_{LS}\hat{h}_{LS}}^{1/2}$ such that $$R_{\hat{h}_{LS}\hat{h}_{LS}} = R_{\hat{h}_{LS}\hat{h}_{LS}}^{1/2} R_{\hat{h}_{LS}\hat{h}_{LS}}^{1/2} \qquad (21)$$

$$R_{\hat{h}_{LS}\hat{h}_{LS}}^{-1} = R_{\hat{h}_{LS}\hat{h}_{LS}}^{-1/2} R_{\hat{h}_{LS}\hat{h}_{LS}}^{-1/2} \qquad (22)$$

This yields $$R_{\hat{h}_{LMMSE}h} = R_{h\hat{h}} R_{\hat{h}_{LS}\hat{h}_{LS}}^{-1/2} R_{\hat{h}_{LS}\hat{h}_{LS}}^{-1/2} R_{h\hat{h}_{LS}}^H \qquad (23)$$

$$= R_{h\hat{h}_{LS}} R_{\hat{h}_{LS}\hat{h}_{LS}}^{-1/2} \left(R_{h\hat{h}_{LS}} R_{\hat{h}_{LS}\hat{h}_{LS}}^{-1/2}\right)^H. \qquad (24)$$

Therefore, the positive definite matrix $R_{\hat{h}_{LMMSE}h}$ has real non-negative eigenvalues, which are squares of the singular values of $R_{h\hat{h}_{LS}} R_{\hat{h}_{LS}\hat{h}_{LS}}^{-1/2}$.

In order to determine what condition on the eigenvalues of $R_{\hat{h}_{LMMSE}h}$ leads to a smaller estimation error (given by tr $R_{ee}$), and how to find an optimal rank reduction, one must consider the difference $R_{hh} - R_{\hat{h}_{LMMSE}h}$. First, note that the estimation error is tr $R_{ee}$, which in turn are non-negative since, as a correlation matrix, $R_{ee}$ is positive semidefinite. A sum of non-negative numbers is minimized when each term is minimized; therefore the smaller the eigenvalues of the difference $R_{hh} - R_{\hat{h}_{LMMSE}h}$, the smaller the estimation error. Since $R_{\hat{h}_{LMMSE}h}$ is Hermitian, so will $-R_{\hat{h}_{LMMSE}h}$ be (only the latter is negative semidefinite). Assume that $\pm R_{\hat{h}_{LMMSE}h}$ has rank r, $1 \leq r \leq M$, and that their eigenvalues, indexed from 1 to M, are arranged in increasing order, e.g. $\lambda_j(-R_{\hat{h}_{LMMSE}h}) = \lambda_{M-j+1}(R_{\hat{h}_{LMMSE}h})$; similarly the eigenvalues of $R_{hh}$ and $R_{ee}$ are arranged in increasing order. The index of the largest nonzero eigenvalue of $-R_{\hat{h}_{LMMSE}h}$ is r. By Weyl's theorem [2, p. 184], $\forall j,k$ subject to $1 \leq j$, $k \leq M$, $j+k \geq M+1$ $$0 \leq \lambda_{j+k-M}(R_{ee}) \leq \lambda_j(R_{hh}) + \lambda_k(-R_{\hat{h}_{LMMSE}h}) \qquad (25)$$

$$= \lambda_j(R_{hh}) - \lambda_{M-k+1}(-R_{\hat{h}_{LMMSE}h}). \qquad (26)$$

Clearly k=r, j=M−r+1, M−r+2, ..., M do verify j+r≥M+1 and thereby (after letting j+r−M $\stackrel{def}{=}$ l)

$$0 \leq \lambda_l(R_{ee}) \leq \lambda_{M-r+l}(R_{hh}) + \lambda_k(-R_{\hat{h}_{LMMSE}h}),$$

$$0 \leq \lambda_l(R_{ee}) \leq \lambda_{M-r+l}(R_{hh}) - \lambda_{M-r+1}(R_{\hat{h}_{LMMSE}h}), \forall l = 1 \ldots r; \qquad (27)$$

$\lambda M-r+1$ is the smallest nonzero eigenvalue of $R_{\hat{h}_{LMMSE}h}$

In short, rank reduction is realized as a low-rank approximation of the Wiener-Hopf matrix $R_{h\hat{h}_{LS}} R_{\hat{h}_{LS}\hat{h}_{LS}}^{-1}$ [1]; rank reduction does result in additional error, since the Wiener-Hopf solution minimizes the estimation error among rill linear estimators. It is shown in [I] that the low-rank approximation of the Wiener-Hopf matrix minimizes the excess estimation error. In order to qualitatively understand how exactly rank reduction of the LMMSE estimate affects the overall estimation error, note first that $\lambda_j(R_{hh})$ are parameters that depend only on the channel, and thus remain outside the control of the LMMSE algorithm. Then, (27) implies that each of the r smallest eigenvalues of $R_{ee}$ decreases as the smallest nonzero eigenvalue of the rank-r $R_{\hat{h}_{LMMSE}h}$ increases (the latter must remain upperbounded by the (M−r+1)-st eigenvalue of $R_{hh}$, due to the positive semidefiniteness of $R_{ee}$. This upperbounding condition will be recognized below to naturally set a limit on how much the rank can be reduced.

Additionally, the lower the r smallest eigenvalues of $R_{ee}$ the lower their sum, which is well known to be upperbounded by the sum of the r smallest diagonal elements of $R_{ee}$; this follows form the fact that the eigenvalues of $R_{ee}$ are majorized by its diagonal elements. Note, further, that the sum of the smallest r diagonal elements of $R_{ee}$ is the cumulative error of the r best channel estimates. It follows from above that increasing the smallest eigenvalue of $R_{\hat{h}_{LMMSE}h}$ leads to reducing the r smallest eigenvalues of $R_{ee}$ which in turn relaxes the lower bound on the cumulative error of the r best channel estimates.

Thereby, while reducing the rank of the estimator (in order to reduce its complexity) from r to p<r does increase the total estimation error, the extra error is distributed to the estimated samples in such a way that not only does it not deteriorate the p best estimates, but it actually enables their improvement, at the expense of the remaining estimates, which absorb the additional error due to rank reduction. This is important because performance in the presence of coding is largely dominated by the best observations (those corresponding to the better channel coefficients).

Equation (24) implies that a means to reduce the rank of $\hat{h}_{LMMSE}$ by selectively employment a subset of the eigenvalues of $R_{\hat{h}_{LMMSE}}$ must rely on the singular values of $R_{h\hat{h}_{LS}} R_{\hat{h}_{LS}\hat{h}_{LS}}^{-1/2}$; one would then expect that the rank reduction procedure, based on SVD, must involve the singular values of $R_{h\hat{h}_{LS}} R_{\hat{h}_{LS}\hat{h}_{LS}}^{-1/2}$.

It can be rigorously shown that rank reduction is indeed based on the singular value decomposition (SVD) of $R_{h\hat{h}_{LS}} R_{\hat{h}_{LS}\hat{h}_{LS}}^{-1/2}$; thereby one must rewrite (14) as $$\hat{h}_{LMMSE} = R_{h\hat{h}_{LS}} R_{\hat{h}_{LS}\hat{h}_{LS}}^{-1/2} \hat{h}_{LS} \qquad (28)$$

$$= Q_1 D Q_2^H R_{\hat{h}_{LS}\hat{h}_{LS}}^{-1/2} \hat{h}_{LS}, \qquad (29)$$

where $$R_{h\hat{h}_{LS}} R_{\hat{h}_{LS}\hat{h}_{LS}}^{-1/2} = Q_1 D Q_2^H \qquad (30)$$

is the SVD of $R_{h\hat{h}_{LS}} R_{\hat{h}_{LS}\hat{h}_{LS}}^{-1/2}$, and D is a diagonal matrix with the singular values of $R_{h\hat{h}_{LS}} R_{\hat{h}_{LS}\hat{h}_{LS}}^{-1/2}$ on the main diagonal, arranged in decreasing order. One can further write $$\hat{h}_{LMMSE} = Q_1 \begin{bmatrix} D_p & 0 \\ 0 & 0 \end{bmatrix} Q_2^H R_{\hat{h}_{LS}\hat{h}_{LS}}^{-1/2} \hat{h}_{LS} + Q_1 \begin{bmatrix} 0 & 0 \\ 0 & D_{M-p} \end{bmatrix} Q_2^H R_{\hat{h}_{LS}\hat{h}_{LS}}^{-1/2} \hat{h}_{LS} \qquad (31)$$

Thereby, a rank-p estimator can be obtained simply by selecting a subset of the singular values of $R_{h\hat{h}_{LS}} R_{\hat{h}_{LS}\hat{h}_{LS}}^{-1/2}$. By the above discussion the optimum rank-p LMMSE estimator is obtained when $D_p$ holds the largest p singular values of $R_{h\hat{h}_{LS}} R_{\hat{h}_{LS}\hat{h}_{LS}}^{-1/2}$; in that case the best rank-p LMMSE estimator is (see also [1, Sec 8.4])

$$\hat{h}_{LMMSE} = Q_1 \begin{bmatrix} D_p & 0 \\ 0 & 0 \end{bmatrix} Q_2^H R_{\hat{h}_{LS}\hat{h}_{LS}}^{-1/2} \hat{h}_{LS} \qquad (32)$$

This is the general expression for the PSAM case, where $Q_1 \neq Q_2$ and (32) cannot be reduced further. However, in the all pilot case, $R_{h\hat{h}_{LS}} = R_{hh}$ and $R_{\hat{h}_{LS}\hat{h}_{LS}} = R_{hh} + \kappa I$, where $\kappa$ is a constant that depends on the constellation and the signal-to-noise ratio (SNR); further, they clearly share the same singular vectors, namely those of $R_{hh}$, which verifies the singular value decomposition $R_{hh} = U \Lambda U^H$, with $\Lambda = \text{diag}(\lambda_1, \ldots, \lambda_N)$. (SNR can be either estimated or approximated, typically by a value in excess of the working SNR.) Then $Q_1 = Q_2 = U$ in (30), and $$D = \Lambda(\Lambda + \kappa I)^{-1/2}. \qquad (33)$$

By straightforward calculations the rank-p estimator of (32) becomes $$\hat{h}_{LMMSE}^p = U \begin{bmatrix} \Delta_p & 0 \\ 0 & 0 \end{bmatrix} U^H \hat{h}_{LS}. \qquad (34)$$

Where $\Delta_p$ is the p×p upper left corner of $$\Delta \stackrel{def}{=} \Lambda(\Lambda + \kappa I)^{-1} = \text{diag}\left(\frac{\gamma_1}{\gamma_1 + \kappa}, \ldots, \frac{\gamma_N}{\gamma_N + \kappa}\right) \qquad (35)$$

This completes the description of optimal rank reduction for the LMMSE estimator.

In OFDM, channel estimation is better performed in the frequency domain. Typically there are two modes in which channel estimation can be performed: all pilot, or block mode, whereby all subcarriers (tones) in one OFDM symbol carry pilot symbols for channel estimation; and PSAM mode, whereby only a subset of the tones are used as pilots while the remaining tones are used for data (traffic payload).

Let N denote the number of tones in an OFDM symbol; then the number L of frequency domain channel samples to be estimated (see Section II-A) verifies $L \leq N$.

Rank reduction is possible [3] in the presence of a cyclic prefix or zero forcing because both the frequency and time dimensions are limited by the one-sided the bandwidth B and the time support interval $\pi_{rms}$ of the time-domain channel impulse response; if $T_s$ is the sampling interval in time domain, then $2B = T_s^{-1}$, $\pi_{rms} \stackrel{def}{=} L_g T_s$, $L_g \in \mathbb{N}$, and the dimensionality is well known to equal approximately $2B\pi_{rms} + 1 = L_g + 1$. This means that the ordered singular values of $R_{hh}$ will be negligible beyond the $(L_g+1)$-st largest singular value, and thereby a reduced rank implementation is possible lithe reduced rank value verifies $p \geq L_g + 1$.

Figure 4:
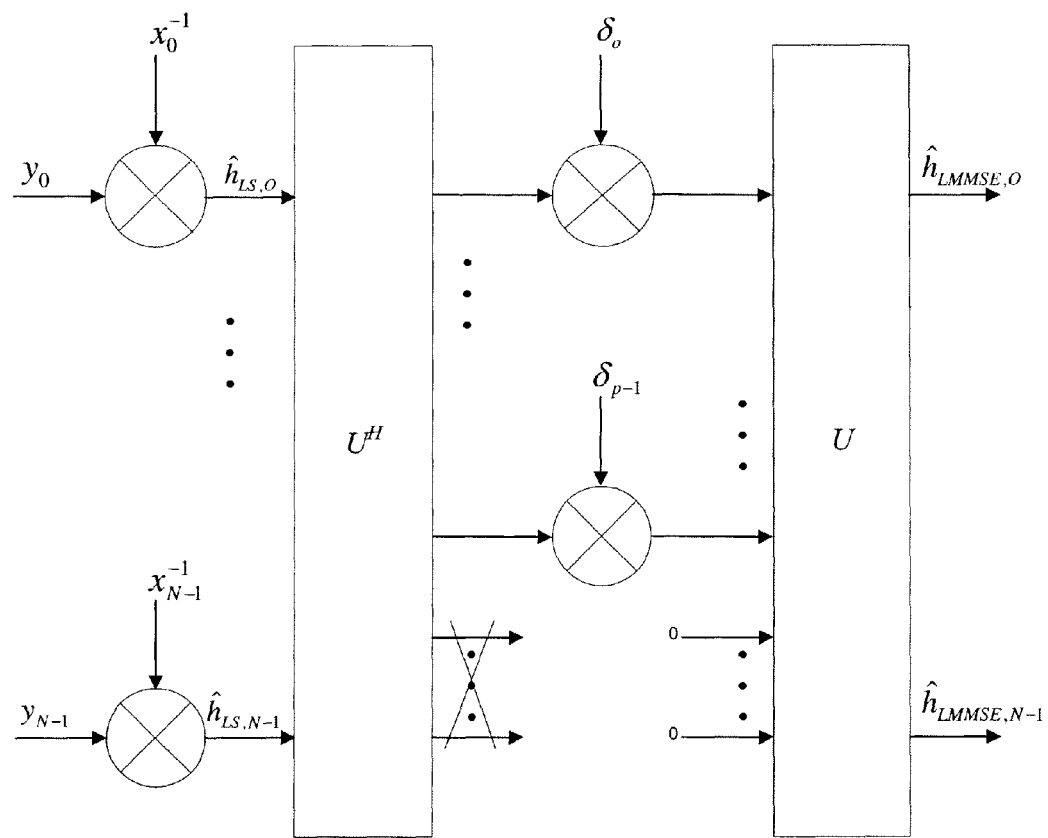
FIG. 4 is a diagram illustrating an example Reduced rank LMMSE channel estimator.

FIG. 4 illustrates a block diagram of LMMSE channel estimation in the all-pilot case. For a PSAM implementation of the LMMSE algorithm, matrices the block diagram of is a very simple modification of FIG. 4, whereby N becomes P, the number of dedicated pilot symbols in an OFDM symbol, and $U^H$, U, are replaced respectively by $Q_2^H R_{\hat{h}_{LS}\hat{h}_{LS}}^{-1/2}$ and $Q_1$, as in (32).

In FIG. 4 a reduced rank LMMSE channel estimation for N-tone OFDM might start with the least squares ("LS") estimator, which might be transformed by a matrix U to remove correlation between components. The N×P matrix U has, along columns, the singular vextors of the channel autocovariance matrix $R_{hh} = U \Lambda U^H$, which can be either estimated and tracked adaptively, or approximated by a worst case autocovariance matrix. For example, an autocovariance matrix that is associated with a uniform power delay profile. In the later case the singular vectors can be computed beforehand. A rank-p estimator uses only the singular vectors associated with the p largest singular values.

Note that $R_{\hat{h}_{LS}\hat{h}_{LS}}^{-1/2}$ can be computed in the receiver from the available LS estimate $\hat{h}_{LS}$, albeit at an additional complexity cost; however, note that the dedicated pilot symbols are sparse within an OFDM symbol, which means that—in the case where channel estimation is done one OFDM at a time—the autocovariance matrix for the all-pilot case (latter is N×N while former is P×P, $P \leq N$). There are methods to implement the PSAM scenario efficiently, using a convolution model, including the case when channel estimation is performed jointly over several OFDM symbols of a packet.

In WiMedia's Multiband OFDM, an additional degree of freedom for channel estimation is frequency hopping, e.g.

across two or three frequency bands in a band group. Although no analysis was done to determine how the autocovariance of the frequency domain channel behaves from band to hand, we conjecture that it is transparent because uniform multiplication by a complex exponential should not change the correlation function, although the individual realizations may differ beyond a frequency coherence interval.

It is important to note that the presence of the anti-imaging and anti-aliasing transmit and receive filters can potentially alter the correlation between samples of the combined end-to-end channel. It can be shown that the deterministic autocorrelation of the samples of the product of the discrete frequency responses of the transmit and receive filters multiplies, like a mask, the autocorrelation coefficients of the true channel's frequency response (which ultimately form the autocorrelation matrix of the true frequency domain channel). Clearly, this mask, or shaping effect on the true fading channel's autocorrelation matrix, can potentially alter the correlation between the true channel samples. However, to the extent that this effect on the autocorrelation matrix of the actual channel is negligible, the effect of the attenuations and phases qf the filters' combined frequency response can be lumped with the frequency domain channel coefficients themselves, and estimated by a LMMSE estimator that relies on a generic channel autocovariance matrix (or a close approximation thereof). This explains why the generic approximation of the true channel autocovariance matrix works very well in a highly dispersive channel, and less so in an AWON-like channel. In the former case, the small correlation in the frequency domain (due to dispersion) in time dominates the correlation in frequency domain, despite of the correlated frequency response of the transmit/receive filters, superimposed on the true channel frequency response; in the latter case the channel itself is not sufficiently uncorrelated to override the effect of the correlated frequency response of the transmit/receive filters, and the approximation of the true channel's autocovariance matrix by that of a i.i.d. power delay profile is no longer accurate.

It is straightforward to verify that the linear combinations of p singular vectors, as illustrated in FIG. 4, amounts to 2p multiplications per tone (inner products plus linear combinations). Likewise, PSAM requires p(1+P/N) multiplications per tone, where P is the number of tones used to carry pilot symbols with a payload OFDM symbol. Thereby simply by using a low rank implementation of LMMSE frequency domain channel estimation the complexity is reduced from 2N to 2p multiplications per tone in the all-pilot case.

Further complexity reduction is obviously possible by virtue of the same dimensionality argument invoked above. By partitioning the frequency domain channel samples to be estimated into K sub-blocks, the bandwidth per block is reduced by K, and in turn the number of time frequency base vectors that contain most of the signal energy is reduced from $(L_g+1)$ to $(L_g/K+1)$. The vector of channel samples to be estimated can be viewed resulting from stacking K subvectors and similarly for the vector of observations. The estimation task becomes equivalent to N/K parallel estimation tasks of size K. Once again. straightforward calculation leads to a complexity of $2(L_g/K+1)$ multiplications per tone. The relative reduction is by a factor of $(L_g/K+1)/(L_g+1)$. A simple plot of the number of multiplications per tone vs. number of sub-blocks is shown in FIG. (2).

The LMMSE algorithm was implemented and simulated for the WiMedia multiband OFDM UWB system for time frequency code TFCO and rate 53.3 Mbps. It was compared with a modified LS estimate obtained by low-pass filtering the raw LS estimate $\hat{h}_{LS}$ (the raw $\hat{h}_{LS}$ is significantly worse that the LMMSE estimator, and than the low pass filtered LS estimator).

Figure 5:
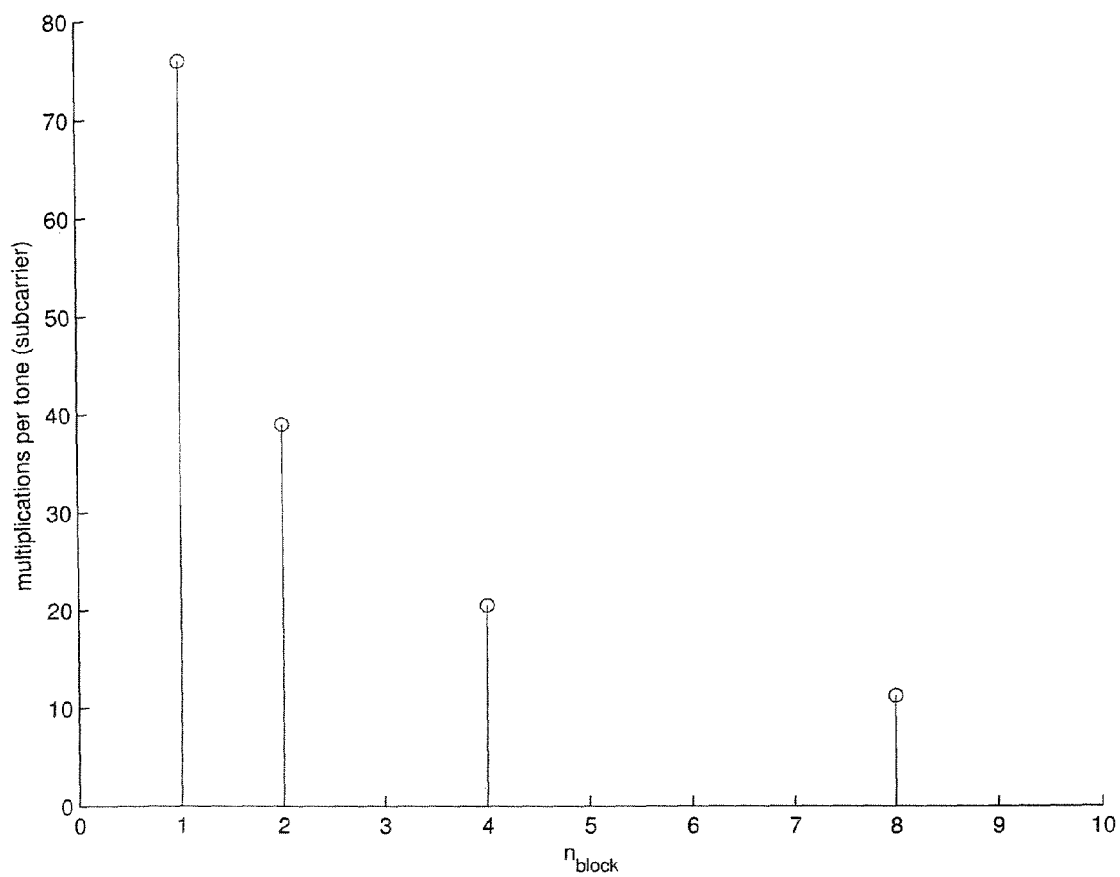
FIG. 5 is a graph illustrating multiplications per tone required by a reduced rank LMMSE equalizer vs. the number of sub-blocks of tones within an OFDM symbol.

FIG. 5 is a graph illustrating an example of the complexity of reduced rank LMMSE frequency domain channel estimation. An example that includes number of multiplications per tone vs. number of sub-blocks within an OFDM symbol is illustrated. In the text $n_{block}$ is denoted K.

Figure 6:
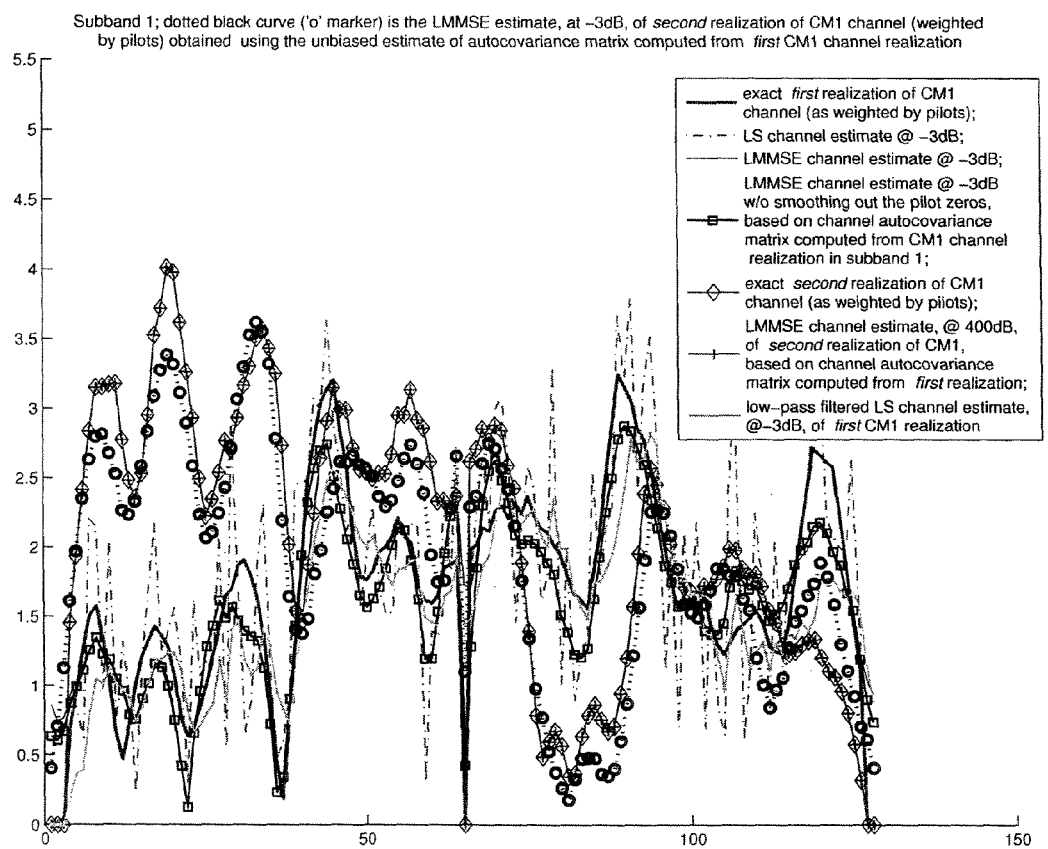
FIG. 6 is a diagram illustrating the performance of frequency domain channel equalization with LMMSE, least squares (LS), and low-pass filtered LS algorithms.

FIG. 6 illustrates the behavior of the LS, low-pass filtered LS, and LMMSE estimators. One can see by visual inspection that the LMMSE channel estimate is much closer to the actual frequency domain channel than the raw LS estimate and the low-pass filtered LS estimate, which sometimes shows a delay due to the convolution (low pass filtering) operation. The improved channel estimate translates into better performance in terms of bit and frame error probabilities.

Performance of estimation of the frequency domain channel with LMMSE, LS and low-pass filtered LS algorithms is illustrated in FIG. 6. A channel covariance matrix might be estimated in various scenarios rather than using a generic (e.g., worst case) channel covariance matrix associated to a uniform power delay profile in the time domain with $\tau_{rms}$ smaller than the length of zero padding. The channel covariance matrix that might be needed by the LMMSE algorithm.

Figure 7:
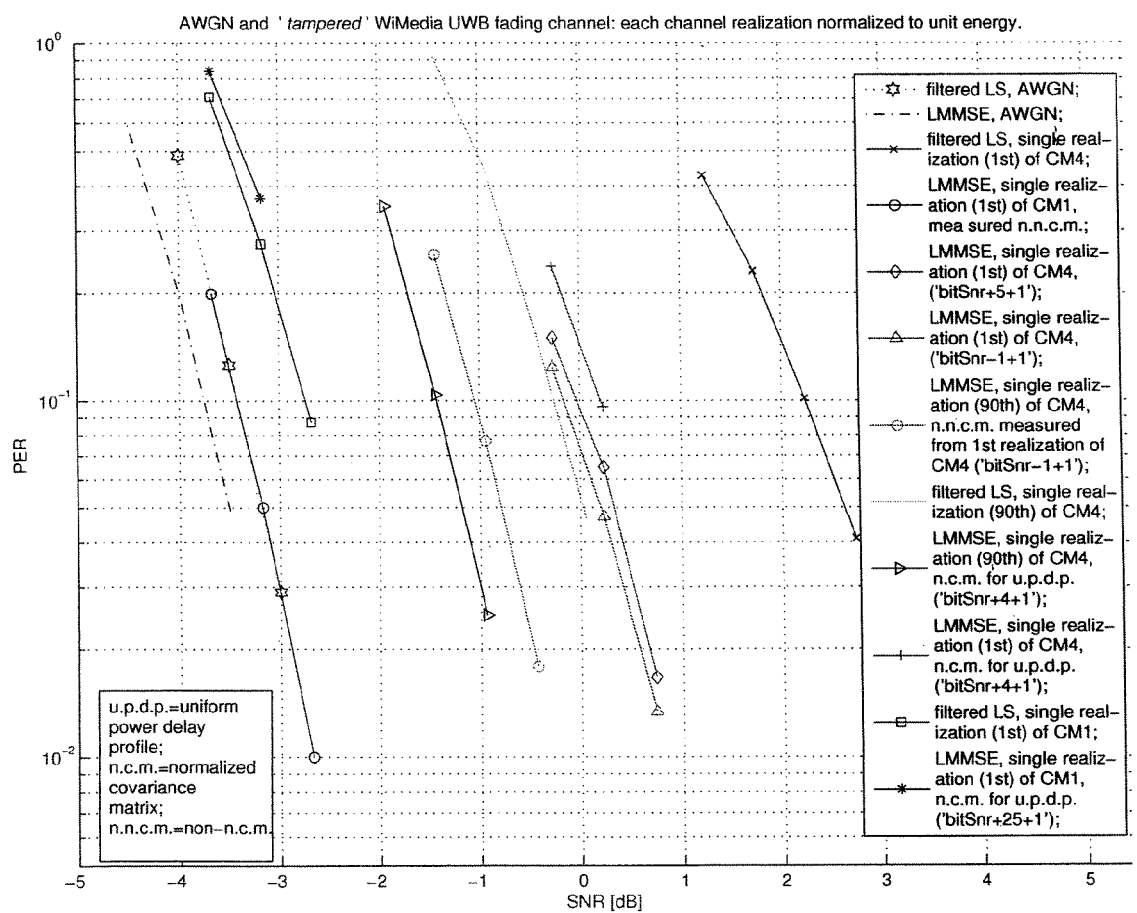
FIG. 7 is a diagram illustrating a comparison of various scenarios involving LMMSE, LS and low pass filtered LS channel estimation.

FIG. 7 illustrates the packet error rate performance in several scenarios based on AWGN and WiMedia/IEEE channel models CM1 and CM4. CM1 is a lot like AWGN, while CM4 has the largest delay spread of the IEEE 802.15.3a channel models. The channel autocovariance matrix needed by the LMMSE algorithm was either estimated or replaced by the 'worst' case autocovariance corresponding to uniform power delay profile (which can be obtained analytically beforehand).

FIG. 7 illustrates a comparison of various scenarios involving LMMSE and filtered LS channel estimation. As illustrated, in one embodiment a significant improvement of LMMSE over low-pass filtered LS can be achieved. For example, as illustrated 1.2 to 2 dB in extreme individual realizations of CM4. For example, when a generic autocovariance matrix is used to approximate the true autocovariance matrix of the combined channel in allfading channel models the improvement due to LMMSE in CM4 might be somewhere between 1 dB and 1.5 dB, even when the performance is averaged over all individual channel realizations. In one embodiment the autocovariance matrix can correspond to a uniform power delay profile. In another embodiment the combined channel can include transmit and receive filters.

Only individual realizations within each channel model were evaluated. Most significantly, the LMMSE shows significant improvement in the CM4 UWB channels, where for individual channel realizations the improvement ranges from about 1.2 dB to 3 dB. It is conjectured that—even in this tampered fading channel (all channel realizations are normalized to unity), and for a generic autocovariance matrix corresponding to a uniform power delay profile—the improvement due to LMMSE in CM4 will be somewhere between 1 dB and 1.5 dB when the performance is averaged over all individual channel realizations.

In CM1, which is more like AWGN than CM4 is, the LMMSE estimator shows about 0.8 dB improvement over low-pass filtered LS estimation when the autocovariance matrix of the combined frequency domain channel (including the transmit and receive anti-imaging and anti-aliasing filters) is estimated at the beginning of each packet. However, when the generic autocovariance matrix corresponding to a uniform power delay profile is used to account for the fact that the transmit and receive filters may not be known from one manufacturer to another, the performance of the LMMSE channel estimator in CM' is slightly worse than that of low-pass filtered LS. While this is considered for future refinements of the LMMSE approach for UWB, it is not considered a handicap; as long as the LMMSE estimator does not lose performance in AWGN-like channels (e.g., CM 1 and perhaps CM2), while gaining significant performance in heavily dispersive channels (e.g., CM4 and CM3), it bring an important advantage over the sub-optimal low-pass filtered LS estimator.

The LMMSE channel estimator that relies on a generic, 'worst' case, beforehand approximation of the true autocovariance matrix of the end-to-end combined channel (including transmit and receive filters) shows significant improvement in dispersive channels (e.g., CM4 and perhaps CM3) and virtually no performance loss in AWGN-like channels (e.g. CM1 and CM2) when compared to a low-pass filtered LS estimator. When a generic autocovariance matrix (corresponding to a uniform power delay profile) is used to approximate the true autocovariance matrix of the combined end-to-end channel (including transmit and receive filters) across the board (e.g., in all fading channel models) the improvement due to LMMSE in CM4 is conjectured to be somewhere between 1 dB and 1.5 dB, even when the performance is averaged over all individual channel realizations.

There are a few drawbacks. One drawback might be added complexity, albeit not severe, in terms of multiplications per tone. The presence of the anti-imaging and anti-aliasing transmit and receive filters can potentially alter the correlation between samples of the combined end-to-end channel. It can be shown that the deterministic autocorrelation of the samples of the product of the discrete frequency responses of the transmit and receive filters multiplies, like a mask, the autocorrelation coefficients of the true channel's frequency response (which ultimately form the autocorrelation matrix of the true frequency domain channel). Clearly, this mask, or shaping effect on the true fading channel's autocorrelation matrix, can potentially alter the correlation between the true channel samples. However, to the extent that this effect on the autocorrelation matrix of the actual channel is negligible, the effect of the attenuations and phases of the filters' combined frequency response can be safely lumped with the frequency domain channel coefficients themselves, and estimated by a LMMSE estimator (that relies on a generic channel autocovariance matrix or a close approximation thereof). This explains why the generic approximation of the true channel autocovariance matrix works very well in a highly dispersive channel, and less so in an AWGN-like channel. In the former case, the small correlation of the true frequency domain channel (due to dispersion in time) dominates the overall correlation in frequency domain—despite of the correlated frequency response of the transmit/receive filters being superimposed on the true channel frequency response; in the latter case the channel itself is not sufficiently uncorrelated to override the effect of the correlated frequency response of the transmit/receive filters, and the approximation of the true channel's autocovariance matrix by that of a i.i.d. power delay profile is no longer accurate. The effect of anti-imaging and anti-aliasing transmit and receive filters is not easily accounted for, beforehand, across manufacturers.

The refinements or extensions of this method, deemed relevant to consumer or proprietary implementations of a UWB product—should the work be continued—are briefly listed below. The value of improved performance may be higher for professional medical equipment products than for consumer products.

1) Extension and simulation of LMMSE to PSAM (e.g., channel estimation not limited to the six, all-pilot channel estimation symbols that precede a payload packet);

2) Use of an adaptive gradient method to adaptively estimate and track the p main singular vectors. This would de facto include the effect of the anti-imaging and anti-aliasing transmit and receive filters, regardless of how their implementation may differ from one manufacturer to another; this includes the parameter κ (see eq. (34)), which depends on SNR, and could also serve as a method for estimating the SNR used in other receiver functions.

3) In wireless universal serial bus (WUSB) products based on multiband OFDM UWB technology, a device talks only to the host. This would particularly enable an adaptive method for estimating and tracking both the end-to-end combined autocovariance matrix and the SNR;

4) A method for aleviating the extent to which the correlation between the true channel samples can be potentially altered due to the combined effect of the anti-imaging and anti-aliasing transmit and receive filters (see second drawback above). Alternatively, such method can be used as a means to extend the efficiency of an approximation to the true channel autocovariance matrix (e.g., by using the autocovariance corresponding to a uniform power delay profile). It is conjectured that some type of interleaving applied to the all pilot OFDM symbols (e.g., to the pilots that comprise the OFDM symbols dedicated to channel estimation before a payload packet) will scramble the phase shifts due to the transmit/receive filters and thereby render them uncorrelated, along with the channel samples, consistent with a generic worst case approximation of the channel covariance matrix. In other words, such a method would improve the applicability of generic, worst case approximations of the channel autocovariance matrix, e.g. by the autocovariance matrix of uniform power delay profile with i.i.d resolvable paths.

5) Whitening the rotated LS estimate by some form of Cholesky decomposition. If an approximation to the autocovariance matrix of the true channel is poor, the rotation by the matrix $U^H$ in FIG. 4 no longer has uncorrelated elements—the more so the poorer the approximation is. In effect, the channel energy is no longer limited to the largest $L_g+1$ singular values. Whitening $U^H \hat{h}_{LS}$ is conjectured to aleviate the effect of incorrectly approximately the true channel's autocovariance matrix. This should work fine as long as the result of LMMSE processing is correctly transformed back to the original space—this time by first undoing the Cholesky transform and then by undoing the initial rotation by $U^H$.

6) Designing an interpolation filter with controlled frequency response at given points (tones) in frequency domain. The merit would lie in the possibility of standardizing a template interpolation filter which would help the same aspect as in the previous items.

The systems and methods described herein might be implemented using a computer. In one embodiment the computer might be a desktop, laptop, or notebook computer. In another embodiment the computer might be a mainframe, supercomputer or workstation. In yet another embodiment the computer might be a hand-held computing device such as a PDA, smart phone, cell phone, palmtop, etc. The computer might also represent computing capabilities embedded within or otherwise available to a given device.

The computer might include one or more processors, which may be microprocessors, microcontrollers, or other control logic and memory, such as random access memory ("RAM"), read only memory ("ROM") or other storage device for storing information and instructions for the processor. Other information storage mechanisms might also be connected to the computer, such as a hard disk drive, a floppy disk drive, a magnetic tape drive, an optical disk drive, a CD or DVD drive (R or RW), or other removable or fixed media drive, such as a program cartridge and cartridge interface, a removable memory (for example, a flash memory or other removable memory module) and memory slot, a PCMCIA slot and card, and other fixed or removable storage units and interfaces that allow software and data to be transferred from the storage unit to the computer.

The computer might also include a communications interface that may be used to allow software and data to be transferred between the computer and external devices. Examples of the communications interface might include a modem or softmodem, a network interface (such as an Ethernet, network interface card, or other interface), a communications port (such as for example, a USB port, IR port, RS232 port or other port), or other wired or wireless communications interface. Software and data transferred via the communications interface are carried on signals, which might be electronic, electromagnetic, optical or other signals capable of being received by a given communications interface. The signals might be provided to the communications interface using a wired or wireless medium. Some examples of a channel might include a phone line, a cellular phone link, an RF link, an optical link, a network interface, a local or wide area network, the internet, and other communications channels.

In this document, the terms "computer program medium" and "computer usable medium" are used to generally refer to media such as, for example, the memory, storage unit, media, and signals on a channel. These and other various forms of computer usable media might be involved in carrying one or more sequences of one or more instructions to the processor for execution. Such instructions, generally referred to as "computer program code" (which might be grouped in the form of computer programs or other groupings), when executed, enable the computer to perform features or functions of the present invention as discussed herein.

While various embodiments of the present invention have been described above, it should be understood that they have been presented by way of example only, and not of limitation. Likewise, the various diagrams might depict an example architectural or other configuration for the invention, which is done to aid in understanding the features and functionality that might be included in the invention. The invention is not restricted to the illustrated example architectures or configurations, but the desired features might be implemented using a variety of alternative architectures and configurations. Indeed, it will be apparent to one of skill in the art how alternative functional, logical or physical partitioning and configurations might be implemented to implement the desired features of the present invention. Also, a multitude of different constituent module names other than those depicted herein might be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention might be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases might be absent. The use of the term "module" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

The invention claimed is:

1. A method of channel estimation in the frequency domain, comprising:

observing a sequence of channel coefficients corresponding to a sequence of pilot tones to obtain a sequence of channel coefficient observations;

reordering the sequence of channel coefficient observations such that the autocorrelation present in a sequence of their respective channel coefficients is reduced;

performing a channel estimation on the reordered sequence of channel coefficient observations using a predetermined channel autocorrelation or autocovariance matrix to obtain a first sequence of channel estimates corresponding to the reordered sequence of channel coefficient observations; and reordering the first sequence of channel estimates to obtain a second sequence of channel estimates corresponding to the sequence of channel coefficients.

2. The method of claim 1, wherein the step of reordering the sequence of channel coefficient observations comprises a pilot interleaving operation at a transmitter.

3. The method of claim 2, wherein the step of reordering the sequence of channel coefficient observations occurs during a channel estimation stage.

4. The method of claim 3, wherein the step of reordering the sequence of channel coefficient observations occurs during a channel estimation stage by deinterleaving observed pilot signals in the receiver.

5. The method of claim 1, wherein the step of performing a channel estimation comprises performing an LMMSE algorithm.

6. The method of claim 1, wherein the predetermined channel autocorrelation or autocovariance matrix comprises a priori information about the reordered channel statistics.

7. The method of claim 6, wherein the autocorrelation or autocovariance matrix corresponds to a uniform power delay profile associated with the largest root mean square excess delay among all foreseen channel modes relevant to the deployed system.

8. The method of claim 1, wherein the step of reordering the sequence of channel coefficient observations occurs as a result of a pilot interleaving operation at the receiver, wherein no pilot interleaving operation occurs at the transmitter.

9. The method of claim 8, wherein the step of reordering the sequence of channel coefficient observations occurs during a channel estimation stage.

10. The method of claim 9, wherein the step of reordering the sequence of channel coefficient observations occurs during a channel estimation stage by interleaving the observed pilot signals in the receiver.

11. The method of claim 10 where reordering the sequence of channel estimates to obtain a sequence of channel estimates corresponding to the first sequence of channel coefficients occurs via a deinterleaving operation that reverts the pilot interleaving operation.

12. The method of claim 11, wherein the interleaving occurs while running an LMMSE algorithm.

13. The method of claim 8, wherein the predetermined channel autocorrelation or autocovariance matrix comprises a priori information about the reordered channel statistics.

14. The method of claim 13, wherein the autocorrelation or autocovariance matrix corresponds to a uniform power delay profile associated with the largest root mean square excess delay among all foreseen channel modes relevant to the deployed system.

15. The method of claim 1, wherein the step of reordering the sequence of channel coefficient observations comprises applying a Cholesky transform to the sequence of channel coefficient observations; and wherein the step of reording the first sequence of channel estimates comprises undoing the Cholesky transform.

16. The method of claim 1, wherein the step of reordering the sequence of channel coefficient observations comprises reordering the sequence of channel coefficient observations such the sequence of their respective channel coefficients is approximately independently distributed.

17. A wireless communication device comprising:
an antenna;
a memory, configured to store instructions;
a processor coupled to the antenna and the memory and configured to execute the instructions; the instructions configured to cause the processor to perform the steps of:
observing a sequence of channel coefficients corresponding to a sequence of pilot tones to obtain a sequence of channel coefficient observations;
reordering the sequence of channel coefficient observations such that the autocorrelation present in a sequence of their respective channel coefficients is reduced;
performing a channel estimation on the reordered sequence of channel coefficient observations using a predetermined channel autocorrelation or autocovariance matrix to obtain a first sequence of channel estimates corresponding to the reordered sequence of channel coefficient observations; and
reordering the first sequence of channel estimates to obtain a second sequence of channel estimates corresponding to the sequence of channel coefficients.

18. The wireless communication device of claim 17, wherein the step of reordering the sequence of channel coefficient observations comprises performing an interleaving operation at a transmitter.

19. The wireless communication device of claim 18, wherein the instructions are further configured to cause the processor to perform the step of reordering the sequence of channel coefficient observations during a channel estimation stage.

20. The wireless communication device of claim 19, wherein the instructions are further configured to cause the processor to perform the step of reordering the sequence of channel coefficient observations during a channel estimation stage by interleaving and deinterleaving observed pilot signals in the receiver.

21. The wireless communication device of claim 17, wherein the instructions are further configured to cause the processor to perform the step of performing a channel estimation comprises performing an LMMSE algorithm.

22. The wireless communication device of claim 17, wherein the predetermined channel autocorrelation or autocovariance matrix comprises a priori information about the channel statistics.

23. The wireless communication device of claim 22, wherein the autocorrelation or autocovariance matrix corresponds to a uniform power delay profile associated with the largest root mean square excess delay among all foreseen channel modes relevant to the deployed system.

24. The wireless communication device of claim 1, wherein the step of reordering the sequence of channel coefficient observations occurs as a result of a pilot interleaving operation at the transmitter.

25. The wireless communication device of claim 24, wherein the step of reordering the sequence of channel coefficient observations occurs during a channel estimation stage.

26. The wireless communication device of claim 25, wherein the instructions are further configured to cause the processor to perform the step of reordering the sequence of channel coefficient observations during a channel estimation stage by interleaving the observed pilot signals in the receiver.

27. The wireless communication device of claim 26, where the instructions are further configured to cause the processor to reorder the sequence of channel estimates to obtain a sequence of channel estimates corresponding to the first sequence of channel coefficients.

28. The wireless communication device of claim 27, wherein the instructions are further configured to cause the processor to interleave the observed pilot signals while running an LMMSE algorithm.

29. The wireless communication device of claim 24, wherein the predetermined channel autocorrelation or autocovariance matrix correlation matrix corresponds to a uniform power delay profile associated with the largest root mean square excess delay among all foreseen channel modes relevant to the deployed system.

30. The apparatus of claim 17, wherein the step of reordering the sequence of channel coefficient observations comprises applying a Cholesky transform to the sequence of channel coefficient observations; and wherein the step of reording the first sequence of channel estimates comprises undoing the Cholesky transform.

31. The apparatus of claim 17, wherein the step of reordering the sequence of channel coefficient observations comprises reordering the sequence of channel coefficient observations such the sequence of their respective channel coefficients is approximately independently distributed.

* * * * *

UNITED STATES PATENT AND TRADEMARK OFFICE
CERTIFICATE OF CORRECTION

PATENT NO. : 7,764,747 B2
APPLICATION NO. : 11/694898
DATED : July 27, 2010
INVENTOR(S) : Dumitru Mihai Ionescu It is certified that error appears in the above-identified patent and that said Letters Patent is hereby corrected as shown below:

Column 24:
Claim 24 should read as follows:

The wireless communication device of claim 17, wherein the step of reordering the sequence of channel coefficient observations occurs as a result of a pilot interleaving operation at the transmitter.

Claim 27 should read as follows:

The wireless communication device of claim 26, where the instructions are further configured to cause the processor to reorder the sequence of channel estimates to obtain a sequence of channel estimates corresponding to the first sequence of channel coefficients via a deinterleaving operation that reverts the pilot interleaving operation.

Column 25:
Claim 29 should read as follows:

The wireless communication device of claim 24, wherein the predetermined channel autocorrelation or autocovariance matrix corresponds to a uniform power delay profile associated with the largest root mean square excess delay among all foreseen channel modes relevant to the deployed system.

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

PATENT NO. : 7,764,747 B2
APPLICATION NO. : 11/694898
DATED : July 27, 2010
INVENTOR(S) : Dumitru Mihai Ionescu Page 1 of 1

It is certified that error appears in the above-identified patent and that said Letters Patent is hereby corrected as shown below:

Column 24, lines 51-54,
Claim 24 should read as follows:

The wireless communication device of claim 17, wherein the step of reordering the sequence of channel coefficient observations occurs as a result of a pilot interleaving operation at the transmitter.

Column 24, Lines 63-67,
Claim 27 should read as follows:

The wireless communication device of claim 26, where the instructions are further configured to cause the processor to reorder the sequence of channel estimates to obtain a sequence of channel estimates corresponding to the first sequence of channel coefficients via a deinterleaving operation that reverts the pilot interleaving operation.

Column 25, lines 5-10,
Claim 29 should read as follows:

The wireless communication device of claim 24, wherein the predetermined channel autocorrelation or autocovariance matrix corresponds to a uniform power delay profile associated with the largest root mean square excess delay among all foreseen channel modes relevant to the deployed system.

This certificate supersedes the Certificate of Correction issued May 15, 2012.

Signed and Sealed this
Twelfth Day of June, 2012

David J. Kappos
*Director of the United States Patent and Trademark Office*